(12) United States Patent
Johnson et al.

(10) Patent No.: US 9,702,753 B2
(45) Date of Patent: Jul. 11, 2017

(54) GRAIN MASS FLOW ESTIMATION

(71) Applicants: Deere and Company, Moline, IL (US); Iowa State University Research Foundation, Inc., Ames, IA (US)

(72) Inventors: Jeremiah K. Johnson, Long Grove, IA (US); Aaron J. Bruns, Bettendorf, IA (US); James J. Phelan, Bettendorf, IA (US); Matthew J. Darr, Ames, IA (US); Robert McNaull, Ames, IA (US)

(73) Assignees: Deere & Company, Moline, IL (US); Iowa State University Research Foundation, Inc., Ames, IA (US)

( * ) Notice: Subject to any disclaimer, the term of this patent is extended or adjusted under 35 U.S.C. 154(b) by 441 days.

(21) Appl. No.: 14/318,165

(22) Filed: Jun. 27, 2014

(65) Prior Publication Data
US 2015/0377689 A1   Dec. 31, 2015

(51) Int. Cl.
| | | |
|---|---|---|
| G01F 25/00 | (2006.01) |
| G01G 19/08 | (2006.01) |
| G01F 1/30 | (2006.01) |
| G01F 1/78 | (2006.01) |
| G01F 1/86 | (2006.01) |
| G01F 1/22 | (2006.01) |
| G01F 1/80 | (2006.01) |

(52) U.S. Cl.
CPC ............. *G01G 19/083* (2013.01); *G01F 1/30* (2013.01); *G01F 1/78* (2013.01); *G01F 1/86* (2013.01); *G01F 25/0046* (2013.01); *G01F 1/22* (2013.01); *G01F 1/80* (2013.01)

(58) Field of Classification Search
None
See application file for complete search history.

(56) References Cited

U.S. PATENT DOCUMENTS

| | | | | |
|---|---|---|---|---|
| 6,029,106 A * | 2/2000 | Hale | .................... | A01B 79/005 |
| | | | | 342/357.52 |
| 6,526,120 B1 * | 2/2003 | Gray | ...................... | G01N 23/04 |
| | | | | 378/51 |
| 2006/0046800 A1 * | 3/2006 | Kaltenheuser | ......... | A01D 41/12 |
| | | | | 460/6 |
| 2012/0200697 A1 * | 8/2012 | Wuestefeld | ............... | G01F 1/00 |
| | | | | 348/137 |
| 2013/0317696 A1 * | 11/2013 | Koch | ................. | A01D 41/1272 |
| | | | | 701/33.1 |

* cited by examiner

*Primary Examiner* — Robert R Raevis
(74) *Attorney, Agent, or Firm* — Rathe Lindenbaum LLP

(57) ABSTRACT

A method of calibrating a mass flow sensor while harvesting grain includes sensing an accumulated mass of a portion of grain within the grain tank with a first sensor. A mass flow rate sensor is calibrated based at least in part on a signal of the first sensor.

23 Claims, 5 Drawing Sheets

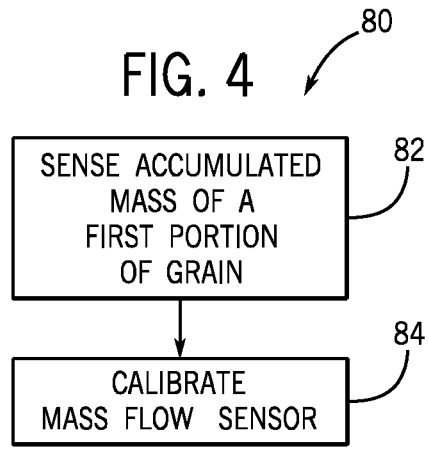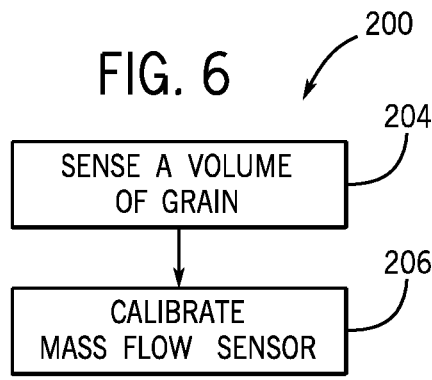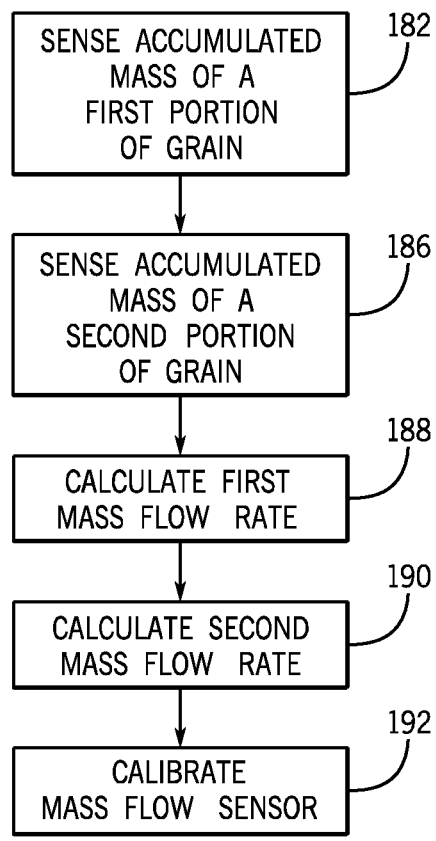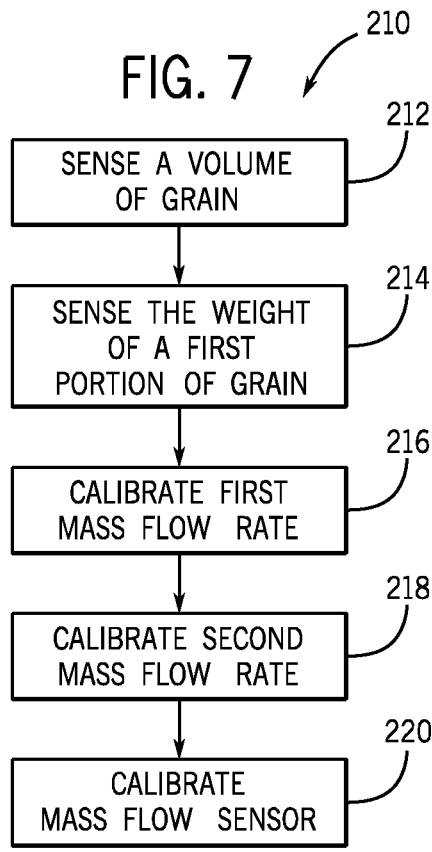

GRAIN MASS FLOW ESTIMATION

CROSS-REFERENCE TO RELATED PATENT APPLICATIONS

This application is being filed on an even-date with a U.S. patent application entitled CALIBRATION OF GRAIN MASS MEASUREMENT having attorney docket P21980 (ISURF 04160), the full disclosure of which is hereby incorporated by reference.

BACKGROUND

Mass flow measuring devices are used in harvesting machines such as a combine to measure the mass flow rate of grain flowing into a grain tank. A mass flow sensor may be positioned to sense grain as it is flowing into a grain tank. A mass flow rate is derived from a signal from the mass flow sensor.

SUMMARY

In one embodiment a method of calibrating a mass flow sensor while harvesting grain includes sensing an accumulated mass of a first portion of grain within the grain tank with a first sensor. A mass flow rate sensor is calibrated based at least in part on a signal of the first sensor.

In another embodiment, a method of calibrating a mass flow sensor while harvesting grain into a grain tank includes sensing the volume of at least a first portion of the grain within the grain tank with a first sensor; and calibrating the mass flow sensor based at least in part on the volume of grain in the grain tank while the grain is being deposited within the grain tank.

In a further embodiment, an apparatus for calibrating a mass flow sensor while harvesting grain includes a non-transient computer-readable medium containing computer readable code directs one or more processing units to calculate the change of mass of the grain within the grain tank during a period of time based at least in part on a signal from the first sensor and a signal from the second sensor and to recalibrate the flow rate signal of the mass flow sensor based at least in part on the change of mass during the period of time.

In yet another embodiment, an apparatus comprises a grain tank; a first sensor to output first signals based upon sensed grain flow into the grain tank; a second sensor to output second signals based upon a sensed accumulated mass of grain within the grain tank; and at least one processing unit to adjust an estimated grain flow determined from the first signals based upon the second signals.

BRIEF DESCRIPTION OF THE DRAWINGS

Figure is a schematic diagram of an example grain mass flow estimation system.

FIG. 4 is a flow chart of an example method to calibrate a mass flow sensor.

FIG. 5 is a flow chart of the method to calibrate a mass flow sensor of FIG. 4 including sensing an accumulated mass of a second portion of grain.

FIG. 6 is a flow chart of another example method to calibrate a mass flow sensor.

FIG. 7 is a flow chart of another example method to calibrate a mass flow sensor.

DETAILED DESCRIPTION

Figure 1A:
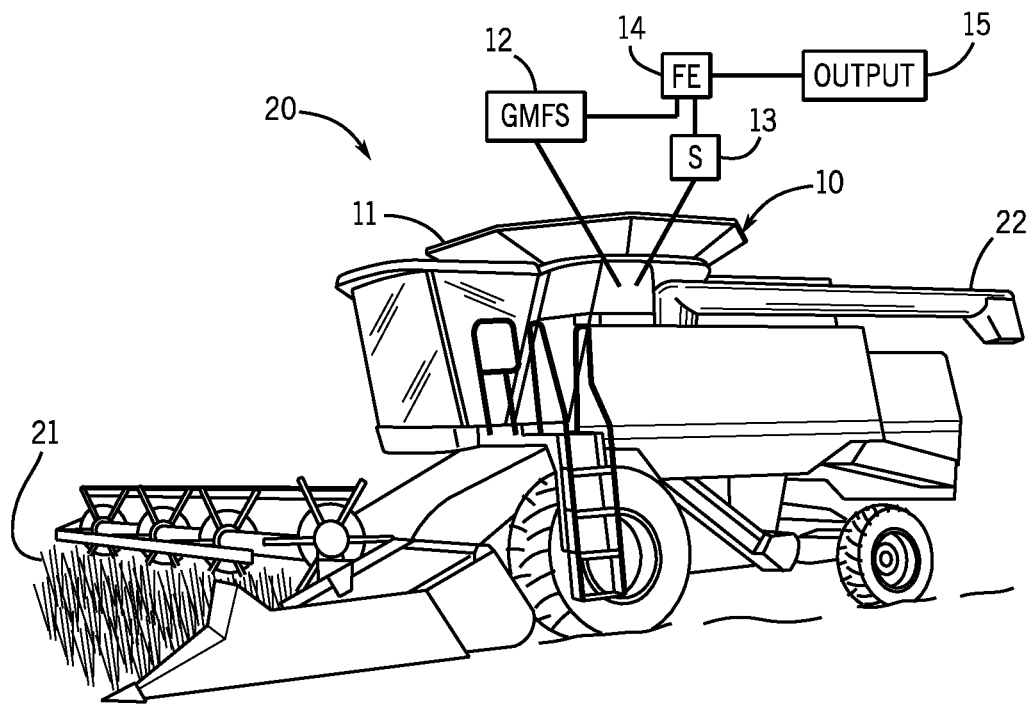
FIG. 1A is an isometric view of an example harvester including the grain mass flow estimation system of FIG. 1.
Figure 1:
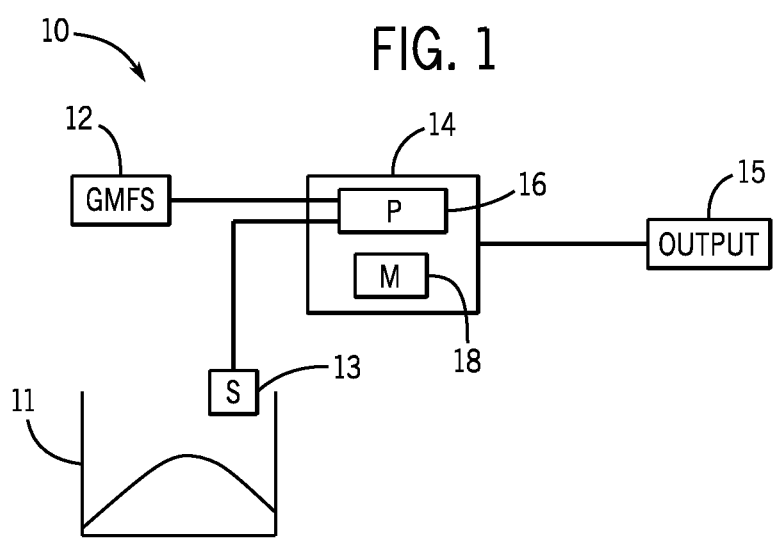

FIG. 1 illustrates an example grain mass flow estimation system 10. As will be described hereafter, system 10 dynamically adjusts or calibrates the measurement of grain flow into a grain receptacle, such as a grain tank. As a result, system 10 facilitates more accurate grain flow measurements to facilitate more accurate grain harvest data.

In the example illustrated, grain mass flow estimation system 10 comprises grain tank 11, grain mass flow sensor 12, sometimes referred to as a yield monitor, grain accumulation sensor 13, flow estimator 14 and output 15. Grain tank 11 comprises a grain receptacle or hopper for receiving grain. In one implementation, grain tank 11 comprises a grain receptacle to receive grain as or while it is being harvested. In one implementation, grain tank 11 is incorporated as part of a machine or harvester harvesting the grain, such as a combine or the like. In yet another implementation, grain tank 11 is transported alongside the harvester, wherein grain is carried or moved from the harvester to the grain tank as the harvester traverses a field. Although illustrated as having a rectangular cross-section, grain tank 11 may have any of a variety of different sizes, shapes and configurations.

Grain mass flow sensor 12 comprises one or more sensors that output signals based upon actual grain flow into grain tank 11. In one implementation, grain mass flow sensor 12 comprises one or more impact sensors which are impacted by grain as the grain is flowing into grain tank 11. In other implementations, grain mass flow sensor 12 may comprise other types of flow sensing devices, including, but not limited to, non-contact sensors. Example of non-contact sensors include, but are not limited to, a radiation or photoelectric sensing device in which a light or radiation source is provided and directed through the grain flow as the grain is being deposited into grain tank 11 from the harvester 12. A receiver detects the amount of light or radiation received through the flow of grain providing a mass flow rate of the grain.

Grain accumulation sensor 13 comprises one or more sensors that output signals based upon a sensed accumulation of grain within grain tank 11. In one implementation, the signals output by sensor 13 are based upon a shape, size or configuration of a mass of grain accumulated within grain tank 11. In one implementation, the signals output by sensor 13 are alternatively or additionally based upon a detected weight of the grain being accumulated within grain tank 11. In one implementation, grain accumulation sensor 13 comprises one or more sensing elements that sense distinct portions of a pile or mound of grain within grain tank 11. In one implementation, sensor 13 outputs signals continuously or periodically as the grain is being accumulated within grain tank 11.

Flow estimator 14 comprises an electronic component that estimates grain flow or the rate of grain flow into grain tank 11 based at least in part upon signals from grain mass flow sensor 12. Flow estimator 14 comprises processor 16 and memory 18. Processor 16 comprises one or more processing units that calculate or estimate grain flow based at least in part upon signals from grain mass flow sensor 12 and in accordance with instructions from memory 18. Memory 18 comprises a non-transitory computer-readable medium or programmed logic that directs processor 16 in the determination or estimation of grain flow and the calibration or adjustment of the sensed flow rate output by sensor 12.

According to one implementation, the term "processing unit" means a presently developed or future developed processing unit that executes sequences of instructions contained in a memory, such as memory 18. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, flow estimator 14 may be embodied as part of one or more application-specific integrated circuits (ASICs). Unless otherwise specifically noted, the controller is not limited to any specific combination of hardware circuitry and software, nor to any particular source for the instructions executed by the processing unit.

Flow estimator 14 dynamically adjusts or calibrates the measurement of grain flow into grain tank 11. As will be described hereafter, in one implementation, flow estimator 14 utilizes signals from sensor 13 to determine a calibration flow rate, a first estimate of a rate at which grain is flowing into grain tank 11. Flow estimator 14 utilizes signals from sensor 12 to estimate a sensed flow rate, a second rate in which grain is flowing into grain tank 11. Flow estimator 14 compares the sensed flow rate and the calibration flow rate and calibrates the measurement of grain flow based upon this comparison. As a result, flow estimator 14 facilitates more accurate grain flow measurements to facilitate more accurate grain harvest data. In one implementation, processor 16 of flow estimator 14 determines an initial estimate of grain flow into grain tank 11 based upon signals from grain mass flow sensor 12. Processor 16, following instructions contained in memory 18, then adjusts or calibrates the initial estimate of grain flow into grain tank 11 based at least in part upon signals received from grain accumulation sensor 13.

In another implementation, flow estimator 14 calibrates the actual operation of grain mass flow sensor 12 based upon signals received from grain accumulation sensor 13. For example, processor 16 may output control signals which cause a sensitivity, scaling or other parameter of sensor 12 to be adjusted or calibrated such that sensor 12 outputs adjusted signals. Processor 16 estimates grain flow based upon the adjusted signals output from sensor 12.

Output 15 comprises a device by which the estimated grain flow is utilized or presented. In one implementation, output 15 comprises a display or monitor by which the estimated grain flow is presented for viewing by an operator of the harvester, by an off-site manager or other person. In one implementation, output 15 comprises a memory, such as memory 18, and/or another memory, which stores the estimated grain flow for subsequent use or analysis. For example, in one implementation, output 15 stores estimated grain flow values corresponding to different times or different geo-referenced locations in a field or other region being harvested. In one implementation, output 15 stores estimated grain flow values corresponding to different operational settings for the harvester. In one implementation, the estimated grain flow values are transmitted to one or more off-site locations for display and/or analysis.

FIG. 1A illustrates grain mass flow estimation system 10 provided as part of a harvester 20 (shown as a combine). As shown by FIG. 1A, grain tank 11 is transported as part of harvester 20. As harvester 20 traverses a field containing crops 21 being harvested, the harvested grain flows into grain tank 11. In one implementation, grain mass flow estimation system 10 continuously or periodically adjusts or calibrates the measurement of grain flow into grain tank 11 as harvester 20 traverses a field based upon signals from grain accumulation sensor 13. The measured grain flow into grain tank 11 is output at output 15.

As noted above, in other implementations, grain mass flow estimation system 10 is alternatively associated with a grain tank 11 transported alongside harvester 20 as harvester 20 traverses a field and as grain is deposited into grain tank 11 by chute 22. For example grain tank 11 may be in a separate vehicle or trailer that moves adjacent to harvester 20. Although flow estimator 14 and output 15 are illustrated as being incorporated as part of harvester 20, in other implementations, flow estimator 14 and/or output 15 are alternatively remotely located with respect to harvester 20, wherein signals from sensors 12 and 13 are communicated to the remotely located flow estimator 14.

Figure 2:
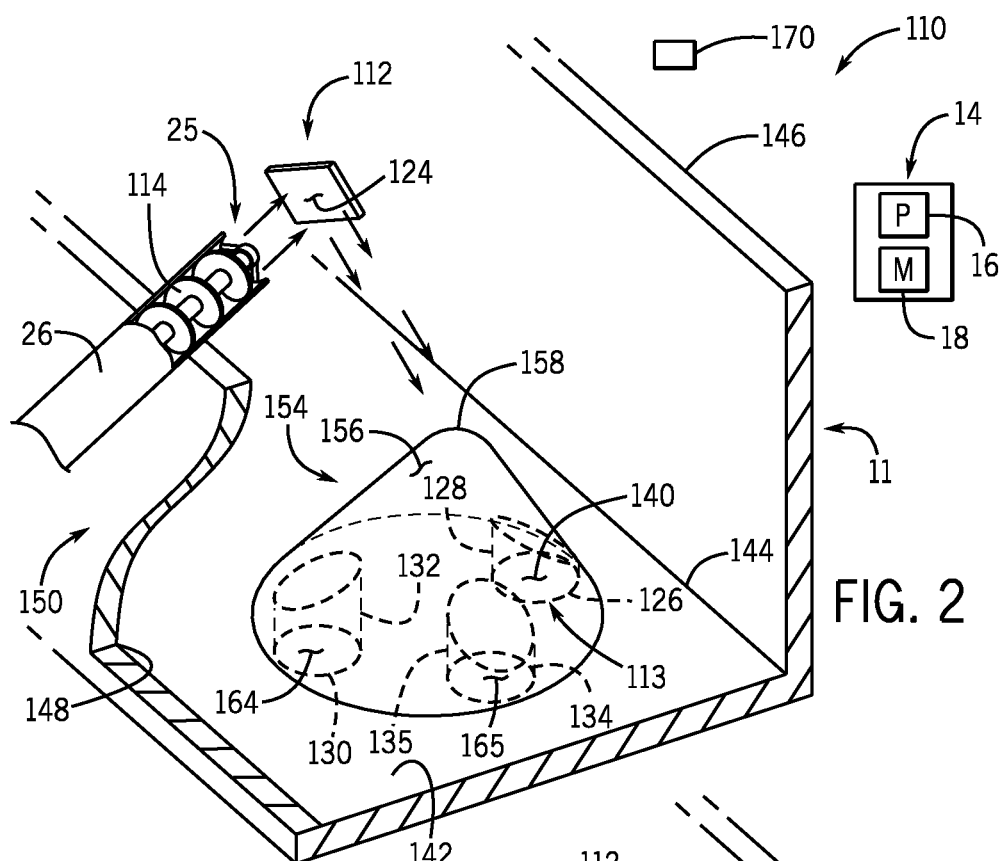
FIG. 2 is a schematic view of an example mass flow calibration system with a grain tank having a first amount of grain.

FIG. 2 illustrates grain flow estimation system 110, an example implementation of grain flow estimation system 10. System 110 is similar to system 10 except that system 110 is specifically illustrated as comprising grain mass flow sensor 112 and grain accumulation sensor 113 in lieu of grain mass flow sensor 12 and accumulation sensor 13, respectively. Those remaining components or elements of system 110 which correspond to components of system 10 are numbered similarly.

In the example illustrated, system 110 calibrates grain mass flow sensor 112 to improve the accuracy of the mass flow rate generated from the grain mass flow sensor 112. Calibration of the grain mass flow sensor 112 is based upon additional information obtained from grain accumulation sensor 113. In one embodiment, the actual mass of the grain collected during a given period may be compared against the mass flow rate calculated by the mass flow sensor 112 during that same period. The difference between the actual mass of the grain collected and the mass flow rate calculated by the mass flow sensor 112 may be used to calibrate the grain mass flow sensor to provide a more accurate mass flow rate while the grain is being harvested. In one embodiment, the calibration of grain mass flow sensor 112 is done in real time while the grain is being harvested and while the grain is filling tank 11.

In the example illustrated, grain mass flow sensor 112, sometimes referred to as a grain flow sensor, comprises an impact based mass flow device that includes an impact surface 124 upon which the grain impacts prior to being deposited within grain tank 11. However, other types of grain flow sensors may also be used, including but not limited to, a non-contact sensor. An example of a non-contact sensor includes a radiation or photoelectric sensing device in which a light or radiation source is provided and directed through the grain flow as the grain is being deposited into grain tank 11. A receiver detects the amount of light or radiation received through the flow of grain providing a mass flow rate of the grain.

In one embodiment, grain mass flow sensor 112 is located proximate an exit 25 of a chute 26 such that harvested grain exiting the chute 26 impacts upon surface 124 of mass flow sensor 112. A load cell such as a transducer operatively connected to surface 124 provides an electronic signal as a function of the amount, rate and/or weight of grain impacting the surface 124 of the mass flow sensor 112. Grain mass flow sensor 112 provides an electronic signal as a function of the grain impacting the sensor. In yet other implementations, other types of mass flow sensors are employed to provide a signal as a function of the grain being harvested by harvester 20. In one implementation, mass flow rate is determined as a function of the electronic signal generated from mass flow sensor 112.

Figure 3:
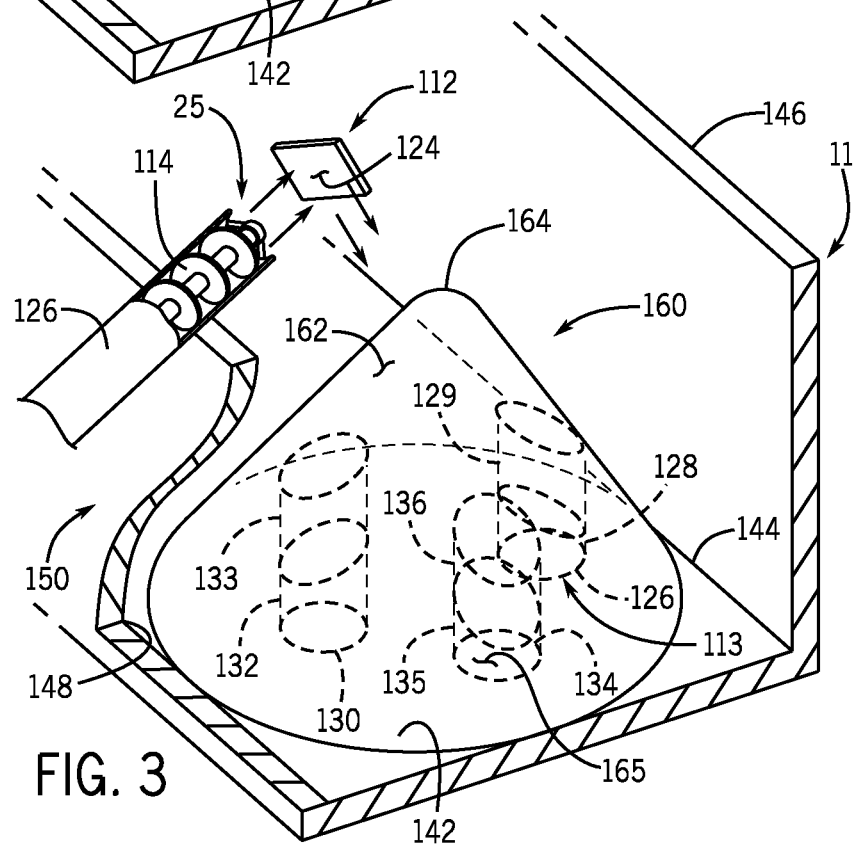
FIG. 3 is a schematic view of the mass flow calibration system of FIG. 2 with the grain tank having a second amount of grain.

As shown by FIGS. 2 and 3, as grain is driven by auger 114, the grain exits chute 26 and falls toward floor 142 of grain tank 11 to form a pile 154 of grain. Pile 154 has a known geometric shape based in part on the geometry of grain tank 11 and the position of chute 26 and the impact surface 124 of mass flow sensor 113. The shape of the pile 154 may also depend on the speed at which grain exits chute 126. In one embodiment, the pile 154 generally defines the shape of a cone with an outer wall 156 and an apex 158. Referring to FIG. 3, as additional grain is deposited within grain tank 11, the pile of grain will grow into a larger pile 160 having a similar geometric cone shape having a new outer wall 162 and a new apex 164. The new apex 164 being higher from the ground and/or floor 142 than apex 158. Stated another way, the distance between the new apex 164 and the floor 142 of grain tank 11 is greater than the distance between apex 158 and the floor 142 of grain tank 11.

In one implementation, the shape of at least an upper portion of the pile of grain within the grain tank takes on a cone like shape after a certain amount of grain is deposited within the tank. When grain is first deposited into grain tank 11, the individual grains hit the floor of grain tank 11 and only begins to form a predetermined shape with an apex and having a conical shape with a circular and/or arcuate cross section after a sufficient amount of grain has been deposited within tank 11. In an example implementation, this amount of grain required in the grain tank 11 to form the predetermined shape is referred to as the minimum amount of grain. Similarly, as grain is continuously added to the grain tank, there comes a point at which the bottom of the grain pile spreads across the width of the grain tank 11 such that the bottom or base portion of the grain pile will begin to assume the shape of the periphery of the grain tank. In an example implementation, the amount of grain deposited within tank 11 such that the pile of grain maintains the predetermined shape is referred to the maximum amount of grain. Accordingly, the pile of grain will have a certain geometric shape when the amount of grain in the grain tank is between a minimum amount of grain and a maximum amount of grain.

In one embodiment, the shape of the grain pile is symmetric while, in other embodiments, the shape of the grain pile is not symmetric. The apex of the grain pile may be centrally located on the grain pile or may be offset geometrically as measured from a center point of the base of the grain pile or of some horizontal cross-section of the pile of grain. Depending on the manner in which the grain is deposited into grain tank 11, there may be more than one region of the grain pile that is higher than other regions. In one embodiment, the pile of grain includes a first portion having a greater height from the ground than other portions of the pile of grain within the grain tank. In one embodiment, the apex of the grain pile is not equidistant from at least two opposing walls of grain tank 11.

Grain accumulation sensor 113 senses the weight of different portions of the mound or pile 154 of grain. In the example illustrated, grain accumulation sensor 113 senses different vertical columns of grain within the pile 154 at different times to determine the rate at which the weight of such portions of pile 154 are changing. In the example illustrated, grain accumulation sensor 113 comprises sensors 126, 130 and 134. Sensor 126 detects or senses the actual mass of a first columnar portion 128 of the grain harvested and deposited in grain tank 11. Sensor 130 senses a second columnar portion 132 of the grain within the grain tank 11. Sensor 134 senses a third columnar portion 133 of the grain within grain tank 11. Flow estimator 14 utilizes signals from each of sensors 126, 130 and 134 to determine a calibration factor to be applied to sensor 112.

In the example illustrated, flow estimator 14 compares changes in the signals from sensors 126, 130, and 134 over time to calculate or estimate the change of mass of each of the portions of the pile of grain within grain tank 11. Flow estimator 14 utilizes the estimated change in the weight of each of the portions to calculate a first flow rate estimate or calibration flow rate estimate. Flow estimator 14 utilizes signals from sensor 112 to calculate a second flow rate estimate or sensed flow rate. By comparing the calibration flow rate estimate and the sensed flow rate estimate, flow estimator 14 determines if and how sensor 112 is to be adjusted or calibrated. In one implementation, flow estimator 14 continuously or periodically calibrates or adjusts the operation of sensor 112 based upon the comparison of the estimated change of mass of grain for each of the portions of the pile of grain within grain tank 11 based upon signals from sensors 126, 130, 134 with the expected change of mass of grain based upon signals from sensor 112.

In one implementation, flow estimator 14 determines the calibration flow rate estimate based upon changes in the total weight of grain within grain tank 11. Flow estimator 14 utilizes signals from sensors 126, 130 and 134 to estimate changes in the total weight of grain within grain tank 11 over a period of time. Flow estimator 14 compares the change in the total weight of grain within grain tank 11 based upon signals from sensors 126, 130 and 134 to the second flow rate value determined from signals from sensor 112. Based upon this comparison, flow estimator 14 calibrates or adjusts sensor 112.

In the example illustrated, one of sensors 126, 130 and 134 is positioned on floor 142 of grain tank 11 in a position that will be directly below the predicted location of the apex. The other of the first, second or third sensors are placed a predetermined distance from below apex. In the example illustrated, sensor 126 is positioned directly below the predicted location of the apex while sensors 130 and 134 are positioned at predetermined distances as measured horizontally and perpendicular from a vertical vector extending downwardly in the direction of gravity from the apex. The general shape of the grain pile may be determined based on the known shape of grain tank 11, the location of chute 26 relative to grain tank 11 and/or the location of the grain flow sensor proximate the grain tank and exit of the chute. In the example illustrated, sensor 130 is located closer to second wall 150 than first wall 146, while sensor 126 is located closer to first wall 146 than second wall 150. Sensor 134 is positioned intermediate the sensor 126 and sensor 130. In other implementations, sensors 126, 130 and 134 have other relative locations within grain tank 11.

In the example illustrated, each of sensors 126, 130 and 134 comprise load sensors having surfaces 140, 164 and 165, respectively. In one implementation, each of sensors 126, 130 and 134 comprises a load cell or transducer that converts the force of the grain upon surfaces 140, 164 and 165 into an electrical signal from which the weight and the mass of the grain above surface 140 may be determined. In the example illustrated, each of sensors 126, 130 and/or 134 specifically comprises a mechanical or electro-mechanical device such as a scale in which the weight and mass of the grain above surface 40 may be determined. In one implementation, sensors 126, 130 and/or 134 provide a pressure reading from the grain located above a portion of the sensor.

In the example illustrated, each of sensors 126, 130, 134 is in direct contact with a portion of the grain within grain tank 11. In the illustrated example, each of sensors 126, 130, 134 does not sense the overall weight of the grain tank 11 but rather senses the weight of the volume or columnar portion of grain vertically above the sensing surfaces 140, 164, 165 within grain tank 11. In the example circumstance illustrated in FIGS. 2 and 3, columnar portion 128 of pile 154 comprises the mass of grain above surface 140 of sensor 126 and extending up to the outer surface 156 of first pile of grain 154. In the example embodiment illustrated, the direction "above" is the direction opposite the direction of gravity. The force exerted by portion 128 is sensed by sensor 126. In this manner, the weight of the portion 128 of pile 154 is determined. Similarly, in one embodiment, the portion 132 is the portion of pile 154 located directly above surface 164 of sensor 130. Columnar portion 132 covers the surface 164 of second sensor 130 and the top or upper end of the second portion of grain 132 corresponds to a portion of outer surface 162 of pile of grain 160. The force exerted by the portion 132 is registered or sensed by second sensor 130. Likewise, sensor 134 senses the columnar portion of pile 154 extending above sensing surface 165 and terminating along the upper surface 156 of pile 154.

In the example illustrated in which sensing surfaces 140, 164, 165 are illustrated as being circular, each of sensors 126, 130, 134 senses the weight of a cylindrical column of grain extending above such sensing surfaces 140, 164, 165. As shown by FIGS. 2 and 3, the bottom of the vertical column is defined by shape, size and orientation of the sensing surface 140, 164, 165 of the top of the vertical column varies depending upon the upper surface shape of the mound of grain within grain tank 11. In other implementations, in lieu of surfaces 140, 164 and 165 being circular, such sensing surfaces 140, 164, 165 have other sizes and shapes, wherein sensors 126, 130, 134 sense columns of grain within grain tank 11 having corresponding cross-sectional shapes. Although each of sensing surfaces 140, 164, 165 are illustrated as being similarly shaped, in other implementations, sensing surfaces 140, 164 and 165 have different shapes and/or sizes relative to one another.

In the example illustrated, surfaces 140, 164 and 165 define co-planar planes. In one embodiment, surfaces 140, 164 and 165 define planes that are parallel to one another. In one embodiment, surfaces 140, 164 and 165 define planes that are neither co-planar nor parallel to one another. In one embodiment surfaces 140, 164 and 165 are located a distance above floor 142 and are all in a horizontal position. In one embodiment, one or more of surfaces 140, 164 and 165 are positioned a distance above floor 142.

In the example illustrated, surfaces 140, 164 and 165 are horizontal such that the direction of gravity is perpendicular to a plane defined by floor 142 when grain tank 11 is in a neutral non-slanted orientation. In one embodiment, the term horizontal is defined by a plane perpendicular to the direction of gravity. In other implementations, surfaces 140, 164, 165 have other orientations depending upon the orientation of the corresponding underlying or overlying portions of floor 142 of tank 11. For example, in another implementation, floor 142 comprises a first portion slanting downward in the direction of gravity from a bottom 144 of side wall 146 and a second portion slanting downward in the direction of gravity from a bottom 148 of an opposing side wall 150. In such an implementation, floor 142 forms a lower linear line where the first portion and second portion meet. In one implementation, the first portion and second portion of floor 142 pivot away from one another or include a trap to allow the grain to be dumped downwardly from grain tank 11. In such an implementation, surfaces 140, 164 and 165 of sensors 126, 130, 134, respectively, extend parallel to their associated portions of floor 142, non-perpendicular or slanted with respect to the direction of gravity.

Although illustrated as load sensors, in other implementations, sensors 126, 130 and 134 comprise other types of sensors. In yet other implementations, sensors 126, 130 and 134 may comprise different types of sensors. For example, sensor 126 comprises a first type of sensor, sensor 130 comprises a second type of sensor and sensor 134 comprises a third type of sensor. Although grain accumulation sensor 113 is illustrated as comprising three spaced sensors 126, 130 and 134, in other implementations, grain accumulation sensor 113 alternatively comprises a greater or fewer number of such sensors. For example, in other implementations, grain accumulation sensor 113 may comprise a single load sensor, wherein flow estimator 14 calibrates sensor 112 based upon signals from the single sensor. Although grain accumulation sensor 113 is illustrated as comprising sensors located along or within floor of grain tank 11, in other implementations, grain accumulation sensor 113 comprises sensors located at other locations along or within grain tank 11 at the same illustrated locations or at other locations.

As shown by FIG. 3, as grain continues to flow into grain tank 11, the size and shape of pile 154 grows to form pile 160. As a result, the height and possibly the upper surface of columnar portions 128, 132 and 135 also change. Columnar portion 129 is added to column portion 128. Columnar portion 133 is added to columnar portion 132. Columnar portion 136 is added to columnar portion 135. The additional weights of columnar portions 129, 133 and 136 are sensed by sensors 126, 130 and 134, respectively. Flow estimator 14 utilizes such sensed weights and the shape of piles 154 and 164 to calculate a flow rate estimate that is used to calibrate sensor 112.

In one embodiment, the general shape of the pile of grain within the grain tank is mathematically modeled. If the geometric shape of the pile of grain is a symmetrical shape, the shape may be modeled with a mathematical algorithm and/or geometric modeling approach. Once a geometric model is created, the volume of the grain pile is determined within the grain tank and/or the mass of the grain pile within the grain tank is determined based only on the accumulated mass above a known load sensor within the tank or based on one or more of the accumulated masses above known load sensors.

In the example illustrated, the location of the sensors 126, 130 and 134 and any additional sensors within grain tank 11 are known and/or determined prior to grain being deposited into grain tank 11. The mathematical model of the general shape of the pile of grain provides the total volume and mass of the entire pile of grain based on the information provided by at least one of the first, second and additional sensors.

Since the ratio of the volume and mass of the portion of grain located directly above a given sensor relative to the entire pile of grain is known, the mass of the entire volume of the pile of grain is determined based at least in part on the mass detected by a given sensor.

Signals from multiple sensors provides enhanced accuracy to the total mass of the entire pile of grain. Although the pile of grain may not provide a pure cone shape, a mathematical model and/or equation may provide the shape of the pile of grain. In one embodiment, the mathematical model of the shape of the pile of grain may have greater accuracy when the amount of grain in the grain tank 11 is between a predetermined minimum amount of grain and a predetermined maximum amount of grain. The minimum and maximum amount of grain, as discussed above, may correspond to the situation where the pile of grain is sufficient to take on the characteristics of the predicted shape but not so great such that the shape is modified by the sides of the grain tank 11.

In yet another implementation, the shape of the pile of grain within grain tank 11 is determined using one or more non-contact sensors 170 such as at least one camera, emitter-detector pair, infrared device and ultrasonic device. In one implementation, sensor 170 is mounted within, alongside or above grain tank 11. In one implementation, sensors 170 are utilized to confirm the expected shape of the pile of grain based upon modeling. In yet another implementation, the shape of the pile of grain within grain tank 11 is determined solely from signals from sensors 170. In still other implementations, other types of sensors may be utilized to sense or detect the volume and/or shape of the pile of grain being accumulated within grain tank 11.

In one implementation, the predetermined location of the first sensor is selected to maximize the accuracy of the mathematical model providing the total mass of the pile of grain. In one implementation, at least one sensor is positioned generally under the predicted location of the apex. In another embodiment at least one sensor is positioned a horizontal distance away from a vertical vector from the apex, such that the sensor is not directly under the apex. In a further embodiment, a first sensor is positioned generally in the area under the apex, and a second sensor is positioned within grain tank 11 such that it is not generally under the apex of the pile of grain but under another portion of the pile of grain. In a further embodiment, a third sensor or more sensors are placed within grain tank 11 to determine the mass and/or weight of a portion of the pile of grain in positions other than the location of the first and second sensors.

In one embodiment, the position of the pile of grain and the location of the first sensor is assumed to be fixed. In this case, the entire volume and mass of the pile of grain may be determined by the signal provided by the first sensor. In one embodiment, the position of the pile of grain is determined based on the signals provided by at least a first sensor and the second sensor. Since the distance between the first sensor and second sensor is known, the signals of the first sensor and second sensor are fit to the predicted shape of the pile of grain there by determining the position of the pile of grain within the grain tank and calculating the volume and mass of the entire pile of grain. In one embodiment the entire mass of grain within the grain tank is determined. In one embodiment, the shape of the grain tank is used to determine the entire mass of the grain within the grain tank.

In one embodiment the change in mass of grain within the grain tank over a period of time is determined. In this embodiment, it is not required to determine the entire amount of grain within the grain tank. As described in more detail below, a mathematical model is used to determine the change in the mass of grain from a first point in time to a second point in time. If the shape of a pile of grain is known, it is possible to determine the change in the mass of grain by determining the change of the size of the pile of grain from a first point in time to a second point in time. In this embodiment it is not necessary to know the amount of grain at the first point in time only the change in the amount of grain between the first point in time and a second point in time. In one embodiment, the shape of the grain tank below the pile of grain is not required to determine the change in mass of grain within the grain tank over a period of time.

In one embodiment the grain in the grain tank forms a shape of a cone having an apex 158 at a first time and a second higher apex 164 at a second later time, where grain is being deposited into the grain tank between the first time and the second later time. In one embodiment apex 158 and/or apex 164 is positioned a first distance from a first wall 146 of grain tank 11 and a second distance from a second wall 148 of the grain tank. In one embodiment the first distance is not equal to the second distance.

FIG. 4 illustrates an example method 80 in which a single sensor element for accumulation sensor 113 is used to calibrate mass flow sensor 112. As shown by block 82, sensor 126 senses an accumulated mass of grain 28 in grain tank 11. As noted above, in one implementation, sensor 126 comprises a load sensor which senses a columnar portion of a pile of grain within grain tank 11, wherein an estimate of the flow of grain into grain tank 11 is determined based upon detected changes in the weight of the columnar portion of the grain pile and a predicted shape of the grain pile. Changes in the weight of the particular portion of the grain pile being sensed by sensor 126 are determined based upon signals from sensor 126 taken at different times during the growth of the pile of grain within grain tank 11.

As indicated by block 84, flow estimator 14 calibrates mass flow sensor 112 based at least in part on a signal of the sensor 126. In one implementation, flow estimator 14 compares the flow rate that is determined based upon the signals from sensor 126 with the flow rate that is determined based upon signals from sensor 112 to determine how sensor 112 should be adjusted or calibrated. Using this comparison, flow estimator 14 calibrates sensor 112. In one implementation, such calibrations are performed by flow estimator 14 in a continuous fashion or in a predefined periodic fashion while grain tank 11 is being filled with grain during harvest.

FIG. 5 illustrates an example method 180. Method 180 is similar to method 80 except that method 180 involves the sensing of two portions of a pile of grain being formed within grain tank 11 during the harvest of the grain to determine calibration flow estimates. As shown by block 186, sensor 130 senses an accumulated mass of second portion 132. In one implementation, like sensor 126, sensor 130 comprises a load sensor which senses changes in the weight of a columnar portion of a pile of above sensor 130.

As indicated by block 188, flow estimator 14 calculates or determines the calibration flow rate, a first estimate of the rate at which grain is flowing into grain tank 11, by determining the rate at which the weight of particular portions of the pile or mound of grain within grain tank 11 is changing over time in combination with the predicted shape of the pile of grain. Flow estimator 14 determines the rate at which the estimated weight of the particular portions of the pile of grain in the grain tank is changing over a particular period of time by determining the weight of the portions above sensors 126 and 130 at different times using signals from sensor 126, sensor 130.

In one implementation, in lieu of using signals from all of the available sensors 126, 130, 134 at different times in combination with the shape of the pile of grain within grain tank 11 to determine a calibration flow rate for calibrating sensor 112 at different times, flow estimator 14 utilizes signals from a selected subset of the total available number or set of sensors in combination with the shape of the pile of grain to determine the calibration flow estimate. In one implementation, grain accumulation sensor 113 comprises an array of individual sensor elements, similar to sensor elements 126, 130 and 134. In such an implementation, flow estimator 14 selectively utilizes the detected change in weight of different portions at different times depending upon the shape of the pile of grain or the extent to which grain tank 11 is filled. For example, in one implementation, when the pile of grain has a first shape, flow estimator 14 utilizes signals from a subset of the entire set of sensor elements to determine the calibration flow estimate to calibrate sensor 112. Later on, when the pile of grain has a second different shape, flow estimator 14 utilizes signals from a different subset of the entire set of sensor elements to determine the calibration flow estimate to calibrate sensor 112 at the later time. By using different subsets of sensors or sensor elements at different times based upon the shape of the pile of grain to determine the calibration flow estimate, flow estimator 14 increases accuracy or reliability of the calibration flow estimate and the accuracy or reliability of the calibration or adjustment applied to sensor 112 at different times.

As indicated by block 190, flow estimator 14 calculates or determines a second mass flow rate or a sensed flow rate using signals from sensor 112. As indicated by block 192, flow estimator 14 utilizes the calibration flow rate determined in block 188 and the sensed flow rate determined in block 190 to calibrate sensor 112. In one implementation, flow estimator 14 compares the calibration flow rate to the sensed flow rate to determine if and how sensor 112 is to be adjusted or calibrated.

In one implementation, the calibration of sensor 112 in block 192 is performed in response to one or more predefined criteria or thresholds being satisfied. For example, in one implementation, flow estimator 14 adjusts or calibrate sensor 112 only when or after the weight of a selected portion of the pile of grain is greater than a predetermined value and less than a second greater predetermined value. For example, in one implementation, flow estimator 14 only calibrates sensor 112 upon the weight of the portion above sensor 126 exceeding a predefined threshold. In another implementation, flow estimator 14 automatically adjusts or recalibrates sensor 112 in response to determining a change in the weight of a selected portion of the pile exceeding a predefined threshold or criteria.

In one embodiment, calibrating is only initiated after a determination is made as to whether the amount of harvested grain deposited within the grain tank falls within acceptable limits to permit the calibration procedure to provide sufficiently accurate results. The range of harvested grain within the grain tank that is necessary to provide sufficiently accurate results for purposes of calibrating a mass flow sensor is determined at least in part on the geometry of the grain tank 11. As discussed above in one embodiment, a predicted shape of the pile of grain in grain tank 11 may require a minimum amount of grain deposited within grain tank 11. Similarly, the predicted shape of the pile of grain in grain tank 11 may require that the amount of grain deposited within grain tank 11 be below a maximum amount of grain. In one embodiment if the amount of grain collected exceeds the predetermined maximum amount of grain the calibration and/or recalibration process is aborted.

FIG. 6 illustrates an example method 200 for calibrating sensor 112. Method 200 is similar to method 80 except that method 200 utilizes a sensed volume of grain as a parameter for calibrating sensor 112. As indicated by block 204, flow estimator 14 utilizes signals from sensor 170 (shown in FIG. 2), to sense or determine a volume of at least one portion of the pile of grain. As indicated by block 206, flow sensor 14 calibrates a mass flow rate sensor 112 based at least in part on the volume of the first portion of grain in the grain tank 11. As noted above, in one implementation, sensor 170 comprises at least one non-contact sensor, such as at least one camera, and infrared device and/or an ultrasonic device, which senses changes in the volume of grain within grain tank 11.

In one implementation, sensor 170 comprises a vision sensor that obtains an image which is processed to determine the shape of at least a portion of the pile of grain. As schematically shown in FIG. 2, in one implementation, sensor 170 is located proximate grain tank 11 to allow for vision of the interior of the grain tank 11. In one implementation, sensor 170 is secured to grain tank 11 or is secured to a structure exterior to grain tank 11.

In the illustrated example, based on instructions in memory 18, processor 16 of flow estimator 14 models the volume of the pile of grain at least in part as a function of the image. Sensor 70 records the shape of the surface of the pile of grain, from which the entire volume of the pile of grain is determined. In such an implementation, flow estimator 14 utilizes the estimated entire volume of the pile of grain at different times to determine the calibration flow rate which is compared to the sensed flow rate from sensor 112 to calibrate sensor 112.

In another implementation, flow estimator 14 determines the calibration flow rate based upon a determinate change in volume of one or more distinct, less than whole, portions of the pile of grain within grain tank 11 at different times. For example, in one implementation, flow estimator 14 determines a first shape of at least part of the exposed surface of the pile of grain at a first time based upon signals from sensor 170 and later determines a second shape of at least part of the exposed surface of the pile of grain at a second time. By comparing the different exposed upper surface shapes of the same portion of the pile of grain at different times, flow estimator 14 determines a change in the volume of the particular portion of the pile of grain. In one embodiment the change of volume of the portion of the pile of grain from the first time to the second time is determined using an algorithm that models the difference or change in volume of the portion of the pile of grain from the first time to the second time. In one embodiment the algorithm is based at least in part on a predicted shape of the pile of grain. Using this determined change in volume, flow estimator 14 determines the calibration flow rate for adjusting sensor 112.

FIG. 7 is a flow diagram illustrating an example method 210, a particular implementation of method 200. Method 210 is similar to method 200 except that method 210 calculates the calibration flow rate additionally based upon a change in the weight over time of each of the one or more portions of the pile of grain accumulating within grain tank 11. As indicated by block 212, flow estimator 14 receives signals from sensor 170 and determines a volume of a particular portion of the pile of grain. In another implementation, flow estimator 14 utilizes signals from sensor 170 to determine a volume of the entire pile of grain accumulating within grain tank 11.

As indicated by block 214, flow estimator 14 additionally receives signals from the one or more sensing elements 126, 130, 134 of accumulation sensor 113 (shown in FIG. 2) indicating the sensed weight of each of the portions of the grain pile extending above sensing elements 126, 130, 134. As indicated by block 216, flow estimator 14 utilizes the sensed weight of each of the portions of the grain pile to calculate a first mass flow rate or calibration mass flow rate. In one implementation, flow estimator 14 determines the calibration flow rate based upon changes in the weight of the individual portions of the pile of grain extending above sensing elements 126, 130, 134 and the shape of the pile of grain accumulating within grain tank 11. In yet another implementation, flow estimator 14 determines the calibration flow rate based upon changes in the weight of the entire pile of grain accumulating within grain tank 11, wherein flow estimator 14 determines the changes in the weight of the entire pile of grain based upon signals from sensing elements 126, 130, 134 at different times and based upon the shape of the pile or mound of grain within grain tank 11. In one implementation, the weight of the entire pile of grain is additionally based upon a weight of grain tank 11 when grain tank 11 is empty.

As indicated by block 218, flow estimator 14 calculates or determines a second mass flow rate or sensed mass flow rate using signals from sensor 112. As indicated by block 220, flow estimator 14 utilizes the calibration flow rate and the sensed flow rate to calibrate sensor 112. In one implementation, flow estimator 14 compares the calibration flow rate to the sensed flow rate to determine if and how sensor 112 is to be adjusted or calibrated. In one implementation, calibration of sensor 112 in block 220 is carried out continuously or a predefined frequency based upon time, movement of the harvester and/or grain harvest.

Figure 8:
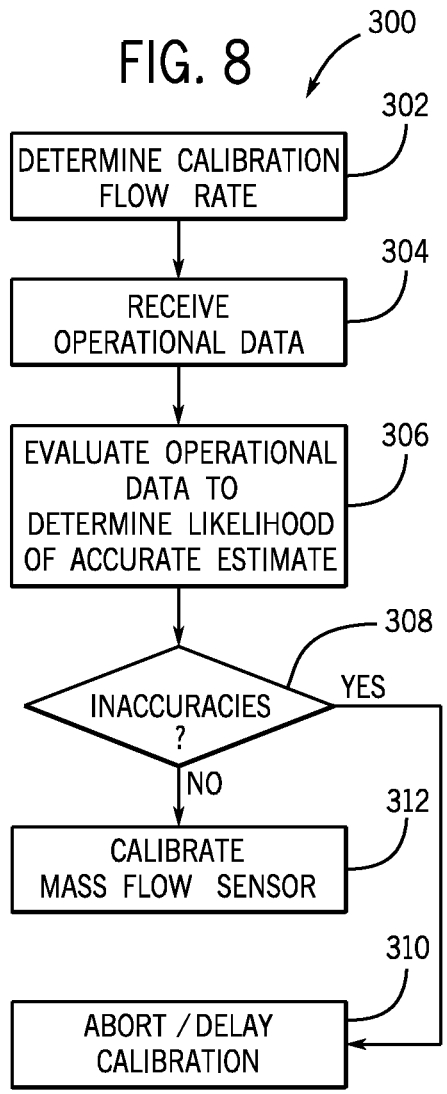
FIG. 8 is a flow chart of another example method for calibrating a mass flow sensor.

FIG. 8 is a flow diagram illustrating an example method 300 for calibrating sensor 112. In one implementation, flow estimator 14 is configured to carry out method 300. Method 300 controls if, when and how sensor 112 is calibrated based upon additional operational parameters or data. As indicated by block 302, flow estimator 14 determines a calibration flow rate for use in calibrating sensor 112. As described above, in one implementation, flow estimator 14 determines a calibration flow rate based upon a shape of the pile of grain and a determined change of mass and/or volume of at least a first portion of the pile of grain in grain tank 11 over a period of time as a function of signals received from at least one sensor, such as one or more sensors 126, 130, 134 and/or 170 as described above.

As indicated by block 304, flow estimator 14 further receives one or more operational data received from at least a first device. Operational data includes, but is not limited to, either alone or in any combination: the volume of grain within the grain tank; the extent of pitch and/or roll of the grain tank; the intensity of vibrations of the grain tank; the angle and speed in which the grain tank was turned; the ground speed of the grain tank; the acceleration and deceleration of the grain tank; the speed of the harvested grain exiting the chute; the period of non-crop engagement; the variation of the mass flow rate over a given period of time; the moisture content of the grain; the type of grain; weather conditions; and the crop terrain including but not limited to the steepness of the terrain in which the grain was harvested.

As indicated by block 306, flow estimator 14 evaluates the operational data to determine the likelihood that an accurate calibration flow rate estimate may be determined. In the example illustrated, flow estimator 14 uses a decision algorithm, stored in memory 18, to determine a likelihood that the change of mass of the at least first columnar portion of grain in the grain tank will provide an accurate estimate of the change of mass of all of the grain within the grain tank. As indicated by block 308 and block 310, if flow estimator 14 determines from the evaluated operational data that the likelihood that the calibration flow rate is not sufficiently accurate, flow estimator 14 aborts or delays the scheduled calibration of sensor 112 at the particular time. Alternatively, as indicated by block 308 and block 310, if flow estimator 14 determines from the evaluated operational data that the likelihood that the calibration flow rate is sufficiently accurate, flow estimator 14 proceed with calibrating sensor 112 using the determined calibration flow rate. In one implementation, flow estimator 14 determines a calibration factor for sensor 112 based upon a comparison of the calibration flow rate and the sensed flow rate.

In one implementation, flow estimator 14 receives operational data comprising the sensed mass flow rate, based upon signals sensor 112, over the period of time in which the harvested grain was deposited within grain tank 11 to determine if the sensed mass flow rate falls within predetermined limits. Flow estimator 14 evaluates the sensed flow rate in block 306 to determine if the sensed mass flow rates of grain into the grain tank vary to an extent greater than a predefined threshold. Per block 310, if flow estimator 14 determines that the sensed mass flow rate is not constant enough such that the calculated calibration flow rate based in part upon the shape of the pile of grain may not provide acceptable accuracy, calibration of sensor 112 using the calibration flow rate is temporarily aborted or delayed until a later time. Alternatively, if flow estimator 14 determines that the sensed mass flow rate is sufficiently constant, having a determined variability less than a predefined threshold, flow estimator 14 proceeds with calibrating sensor 112 using the calibration flow rate.

In another implementation, flow estimator 14 receives operational data such as a current state of the harvester to determine whether calibration of sensor 112 should be carried out. In one implementation, per block 304, flow estimator 14 receives signals indicating a pitch and/or roll of grain tank 11.

Per block 306, flow estimator 14 evaluates such signals to determine if the amount of pitch and/or roll of grain tank 11 is outside of an acceptable range. When harvester 20 and/or grain tank 11 pitches and/or rolls, the shape of the pile of grain within grain tank 11 may be modified from its predicted shape. The steepness of the terrain where the grain is being harvested, the vibrations of the grain tank 11, the extent to which the grain tank is turned sharply or rapidly the extent to which the grain tank is subject to rapid accelerations and decelerations, and the ground speed of the harvester and/or grain tank 11 during harvesting of the grain will impact the shape of the grain pile collected within the grain tank. If the shape of the pile in the grain tank deviates from the predicted shape used in the mathematical model, the accuracy of mathematical model to determine the accumulated grain during the relevant period of time will be impacted. In one implementation, if the amount of pitch and/or roll of grain tank 11 falls outside of predetermined limits, the calibration and/or recalibration process is terminated or delayed per block 310.

Figure 9:
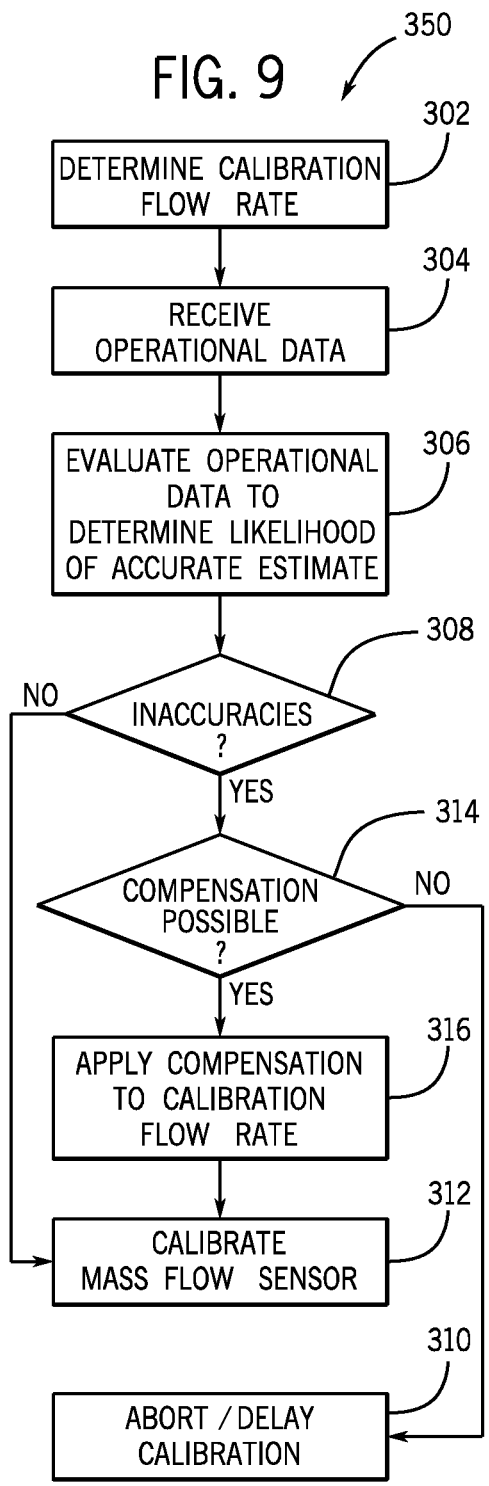
FIG. 9 is a flow chart of another example method for calibrating a mass flow sensor.

FIG. 9 is a flow diagram of method 350, another example implementation of method 300. Method 350 is similar to method 300 except that method 350 determines whether any possible inaccuracies identified from the evaluation of the operational data may be compensated, allowing continued calibration of sensor 112. Those steps or blocks of method 350 which correspond to steps or blocks of method 300 are numbered similarly.

As shown by FIG. 9, as compared to method 300, method 350 additionally comprises blocks 314 and 316. In decision block 314, flow estimator 14 determines whether flow estimator 14 may compensate for the possible inaccuracies identified in block 308. As indicated by block 310, if such inaccuracies cannot be compensated, calibration of sensor 112 is aborted or delayed. Alternatively, as indicated by block 316, if such possible inaccuracies identified as a result of the evaluation of operational data in block 306 may be compensated, flow estimator 14 applies one or more compensation factors or amounts to the calibration flow rate to address the identified inaccuracies. Once the compensation factor has been added to the calibration flow rate, flow estimator 14 proceed with calibrating or adjusting the mass flow sensor 112 as indicated by block 312.

In one implementation of method 350, per block 304, flow estimator 14 receives signals indicating an amount of pitch and/or roll of grain tank 11. Pursuant to block 306, flow estimator 14 evaluates such operational data to identify possible inaccuracies in the calibration flow rate determined using the results of block 302. In accordance with block 312, flow estimator 14 determines if the amount of pitch and/or roll of grain tank 11 during the period in which the grain in grain tank 11 was collected falls outside of the predetermined limits such that inaccuracies may result. As indicated by block 314, flow estimator 14 determines whether the effects of the pitch and/or roll may be compensated. As indicated by block 316, flow estimator 14 compensates for the identified inaccuracies. In one implementation, flow estimator 14 revises the mathematical model of the geometric shape of the pile of grain within grain tank 11 to take into account the impact that pitch and/or roll has on the geometric shape of the pile of grain. In this manner, the mathematical model will provide accurate results even though the pitch and/or roll has altered the shape of the pile of grain.

In one implementation, flow estimator 14 compensates for inaccuracies, such as those inaccuracies brought about by a pitch or roll of grain tank 11, by selectively adjusting which of the sensing element of grain accumulation sensor 113 are utilized to determine the calibration flow rate. For example, in one implementation, grain accumulation sensor 113 comprises an array of sensing elements at different locations or having different sensing characteristics. Flow estimator 14 selects and utilizes signals from a subset of the available sensing elements to determine the calibration flow rate in step 302.

In one embodiment, if the pitch and/or roll has been constant, mathematical modeling is used to adjust the position of the pile of grain relative to gravity and the impact on the sensor 126 and/or sensor 130 and/or additional sensors, such as sensor 134, be accounted for. In one embodiment the pitch and/or roll of the grain tank 11 is determined based on sensors that are either located on the grain tank 11 or proximate to the grain tank 11 such that the sensors provide an accurate representation of the pitch and roll of the grain tank 11. For example, if the grain tank is integral and/or has the same pitch and/or roll as harvester 20, sensors may be placed on or relative to harvester 20 to detect and report pitch and/or roll. In one embodiment, the pitch and/or roll may be evaluated and stored for the entire period or at selected time intervals in which the grain in grain tank 11 was collected. Alternatively, the pitch and/or roll data from a sensor is only sent to processor 16 of flow estimator 14 if a certain predetermined threshold is exceeded. The orientation of grain tank 11 may be determined to evaluate the data from at least one of sensor 126, sensor 130 and additional sensors 134 to compensate for the grain tank being at a non-neutral orientation, which in one embodiment means an orientation by design of the grain tank relative to the direction of gravity.

Non-crop engagement may include the period of time between the point in which a harvester exits a crop and reenters the crop. In one embodiment the engagement or non-engagement of the crop that may occur as a harvester moves into and out of the crop such as between rows or area of a crop where no harvesting occurs. In one embodiment, this period of time is accounted for in the determination of the changes of mass of grain during a period of time and/or the calibration process. In one embodiment, the period of time in which the harvester is outside of the crop is accounted for and deducted from or subtracted from the overall period during which grain is being harvested. This eliminates the time period in which no harvesting is taking place. The time delay between harvesting and the deposit of grain into the grain tank is also taken into account as a factor. It may be the case that grain is continued to be deposited into the grain tank while the harvester is physically outside of the crop while the harvester exits, turns and renters the crop field. The period of time in which harvesting is interrupted may be accounted for and properly adjusted. Additionally, the time delay between cutting the plant material and the grain being deposited into the grain tank may also be accounted for in the determination of mass flow rate and/or accumulated load weight over a given period of time. The time being adjusted for period of time in which the harvester is outside of the field and/or in which no grain is being harvested.

In one embodiment, operational data includes the moisture content of the grain being harvested. The moisture content of the grain being harvested is determined with a sensor proximate the grain tank while the grain is being harvested, or alternatively a moisture content factor may be input via a user interface to flow estimator 14.

In one embodiment, where the operational data fall outside of acceptable limits that would provide an accurate determination of the mass flow rate of grain during a period of time of interest, the calibration process will be aborted. In one embodiment, where the operation data fall outside of ideal limits but not outside of acceptable limits, the calibration process is continued and an accuracy indicator is provided. The accuracy indicator increases the likelihood that the mathematical model provides accurate results. The operator may then evaluate whether to calibrate the mass flow sensor based on whether the results of the mathematical model would provide an improved calibration of the mass flow sensor 112.

In another embodiment, operational data are evaluated prior to a determination as to whether the data is sufficient to calculate a change in accumulated load mass and/or mass flow rate. In one embodiment, a quality metric is applied to each obtained operational data measurement. The quality metric of each obtained operational data measurement may be binary value or a probability that the measurement obtained will result in a quality or erroneous calculation of the accumulated grain mass and/or mass flow rate. The quality metric and/or probability of each measurement may be combined together in such a way as to determine a cumulative probability that the accumulated grain mass and/or flow rate taken during a period of time will not be erroneous and/or of value. A probability of the quality of accuracy of the estimated accumulated mass is determined based as a function of the quality of the individual measurements and the collective use of the individual measurements. In one embodiment, operational data is evaluated from at least a first device and a decision algorithm may be used to determine a likelihood that the estimate of the mass of grain in the grain tank is accurate.

The methods and apparatus described herein may be applied while the harvester is in the field, outside of the field and/or on the go. For purposes of one embodiment, on the go describes the period while the harvester is actually moving within the field, harvesting grain such that grain is being taken from the field, processed on the harvester and deposited within a grain tank. In contrast, the term in-field describes where the harvester is located in the field but may or may not be harvesting grain at a particular time. While outside the field describes the situation where the harvester is no longer in the field and/or harvesting grain. In one embodiment the estimation of accumulated mass of grain and calibration of the mass flow sensor is conducted while on the go. It is also contemplated that estimation of the accumulated mass of grain and/or calibration of the mass flow sensor may be conducted in-field and outside of the field.

Figure 10:
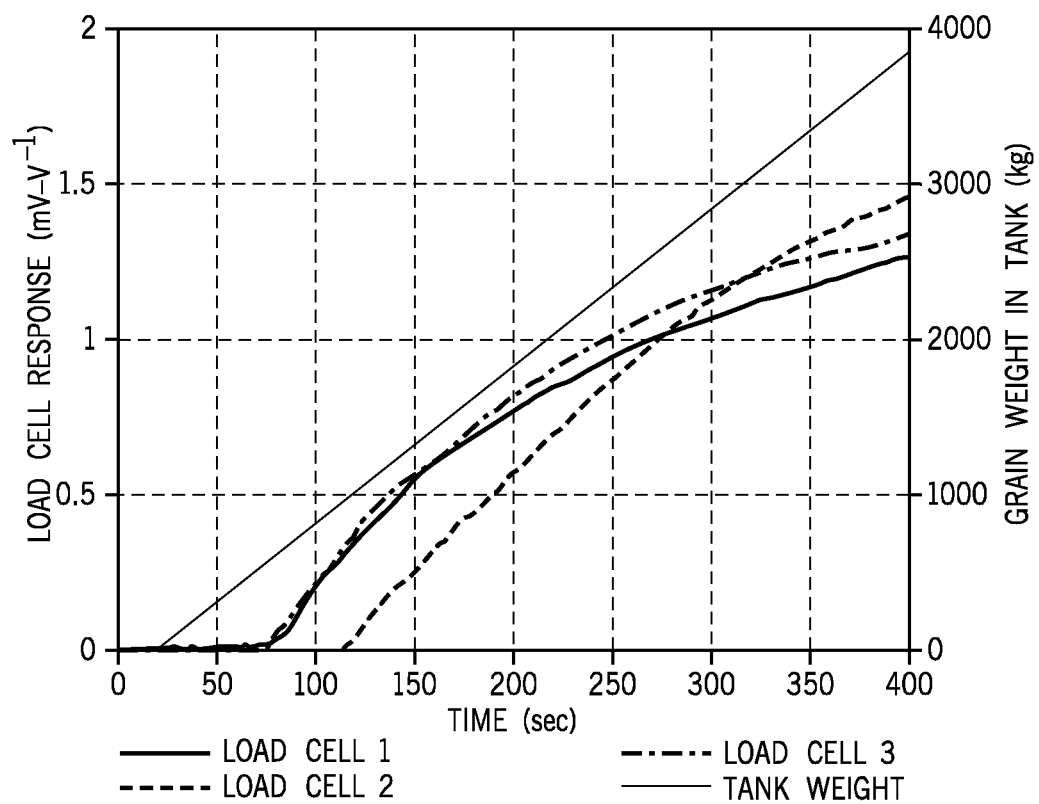
FIG. 10 is an example graph illustrating the relationship of load cell signals and weight of grain in a tank.

FIG. 10 is a graph illustrating the relation between three different sensors and the total grain weight in grain tank 11. The initial response of the load cells or sensors is a relatively linear. In the example illustrated in FIG. 5, this initial region of response is from approximately 0.1 mV/V to 0.6 mV/V. Several pieces of information can be extracted from this region to provide estimate the flow rate of grain into grain tank 11 and give some sense of the accuracy of the estimate. This information is then applied in a regression equation that provides a resulting estimated mass flow rate in kg-s$^{-1}$.

The load cell placement and equations are specific to a given harvester design. In one implementation, modifications to the fountain auger 114 and the way that the grain is expelled into the tank 111 utilize a different regression equation to achieve and acceptable accuracy level. The same information is expected to be extracted from the load cell responses that is further described in this document for a different hardware configuration with possibly additional modifications to the specified calibration ranges.

In one embodiment a general regression equation for estimating the flow rate of grain into grain tank $$11 = C_1 \times \frac{LC3slope}{AoR_2} + C_2 \times SudoMassFlow + C_3 \times LC1slopeI + C_4 \times LC3slope + C_5 \times AoR_2 + C_6 \times LC1slopeII.$$

LC1slopeI is the Rate of response of Load Cell 1 in first specified range;
LC1SlopeII is the Rate of response of Load Cell 1 in $2^{nd}$ specified range;
LC3Slope is the Rate of response of Load Cell 3 in specified calibration range;
AoR$_2$ is the Estimated angle for repose of grain between Load Cell 3 and Load Cell 2; and
SudoMassFlow is the Proxy estimation of mass flow based on Load Cell 1 response, time interval, and estimated angle of repose between Load Cell 1 and Load Cell 2

In one embodiment the parameters selected for the regression equation are developed through evaluation of the load cell responses to determine the most accurate and repeatable method to estimate the grain mass flow rate. In one embodiment parameters are selected based on their statistical significance to reducing the error in the mass flow estimate.

In one embodiment where multiple sensors 126, 130, 134 are used and in different locations within grain tank 11, one of the sensors may respond after the other two sensors. The linear regions of the responses of the three sensors may overlap some, but is dependent upon the angle of repose and density of the grain. This introduces some variability in estimating a flow rate as the information from the sensors. Two of the sensors may be extracted during a different flow rate than the third sensor based on the difference in time in which the grain piling reaches each sensor.

In one embodiment the rate of change of the sensors has a high correlation to the mass flow of grain into the grain tank with a linear response to increasing grain flow. All three sensors responses may be included in a regression analysis to reduce error in the estimation of the grain mass flow rate.

In one embodiment the calibration algorithm may take into account the history of calibration prior to calibrating based on the probability of the accuracy of the measurements. For example, for an initial calibration, a lower probability of quality of accuracy may be used in the calibration process. However, after calibration has been performed a higher probability of quality of accuracy of the accumulated grain mass and/or mass flow rate than was previously acquired will be required to ensure that the calibration or recalibration does not result in a poorer accuracy of the mass flow rate.

It is possible to estimate the amount of grain within the grain tank between at a first time and then estimate the amount of grain within the grain tank at a second later time. It is also possible to estimate the flow rate of grain between a first time and a second time without actually estimating the entire mass of grain within the grain tank. The calibration algorithm may estimate the change in mass of the grain between the first time and the second time without estimating the entire mass of grain in the grain tank at either the first time or the second time that signals are received from the sensors or load cells. The second time refers to a period of time after the first time during which grain is deposited into the grain tank.

In one embodiment, a calibration process begins once the pile of grain within grain tank reaches a minimum volume. The calibration process is concluded prior to there being a maximum predetermined amount of grain within the grain pile in the grain tank. In another embodiment, calibration process beings when the grain tank is empty and concludes once the predetermined minimum amount of grain has been deposited into the grain tank. In another embodiment, the calibration and/or recalibration process occurs while the grain is being harvested and the calibration factor is applied to the mass flow rate for the rest of the harvesting period. In another embodiment, the calibration factor is applied to the mass flow rate data that has been stored in memory to provide a more accurate mass flow rate for the entire harvesting period. In this manner, the mass flow rate of grain obtained and later analyzed from the mass flow sensor is more accurate from the beginning of the grain harvest. A grain yield map may be provided showing the mass flow rate of grain for areas of the field or crop being harvested. The grain yield map may be based on the mass flow rate of the mass flow sensor adjusted with the calibration and/or recalibration factor or factors obtained during the calibration process.

In one embodiment, the operational data may be collected and stored in memory over a period of time. The operational data may be evaluated over various time periods in which the operation data was collected. A particular period of time may be selected from the overall period of time in which data was collected to obtain or calculate an estimated accumulation of mass of grain and to calibrate the mass flow sensor. For example, if operational data is obtained every ten seconds over a ten minute period, and it is determined by an algorithm that the probability of accurately estimating the accumulated grain mass is greatest during a three minute period between the fourth minute and the seventh minute, then the operational data obtained during that three minute period may be used to estimate the accumulated mass of grain and to calibrate the mass flow sensor. In one example, calibration of the mass flow sensor may be updated multiple times as the probability that the operation data during given time frameworks will provide a greater accuracy of the estimated. As noted above, in one embodiment the calibration of the mass flow sensor may be done on the go. The accumulated mass, once calculated, is determined both at a first time and at a second time. The change in accumulated mass between the first time and the second time may be used to determine the change in mass over the period of time between the second time and the first time. By way of example if the estimated accumulated mass at a first time is determined to be a value "x" and the estimated accumulated mass at the second time is determined to be a value "y", the accumulated mass during the period between the second time and the first time is "y-x".

The signal from the mass flow sensor may be stored in memory and once calibration of the mass flow sensor is done, the data stored from the mass flow sensor prior to calibration may be adjusted to provide a more accurate mass flow rate over the entire period in which the harvester was operational for a particular field over a particular period of time.

In one embodiment, multidimensional calibrations may be employed based on moisture of the grain, rate of yield, and. or terrain conditions. This would permit calibration of the mass flow sensor based on certain crop conditions and would allow for instantaneous changes to the calibration based on sensor input of grain moisture, terrain conditions, flow rate and other measurements identified herein either alone or in combination with other measurements. In one embodiment different calibration curves may be used to calibrate the mass flow sensor based on sensor data related to moisture of the grain or terrain and/or other operational data measurements. The calibration may be made on the go to reflect grain moisture and/or other selected metrics, thereby providing a higher level of accuracy of the mass flow rate.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to example embodiments and set forth in the following claims is manifestly intended to be as broad as possible. For example, unless specifically otherwise noted, the claims reciting a single particular element also encompass a plurality of such particular elements.

What is claimed is:

1. A method of calibrating a mass flow sensor while harvesting grain comprising:
    sensing an accumulated mass of a first portion of grain within a grain tank with a first sensor, the first sensor having a surface to directly contact grain in the grain tank, the first sensor to provide a signal indicating a total mass of a column of the grain located directly above the first sensor, the column of the grain having a cross-sectional area corresponding to a surface area of the surface of the first sensor; and
    calibrating a mass flow rate sensor based at least in part on a signal of the first sensor.

2. The method of claim 1 further including sensing an accumulated mass of a second portion of grain within the grain tank with a second sensor, and wherein the step of calibrating the mass flow rate sensor is based at least in part on the signal of the second sensor, the first sensor being positioned within the grain tank at a first position and the second sensor being positioned within the grain tank at a second different position.

3. The method of claim 1 wherein sensing the accumulated mass of the first portion of the grain includes sensing the mass of the first portion of the grain at a first time and sensing the mass of the first portion of the grain at a second time.

4. The method of claim 1 wherein the first sensor provides a signal related to the weight of the column of grain located above the first sensor.

5. The method of claim 1 wherein the grain in the grain tank forms a shape including a first portion having a greater height from the ground than other portions of the grain within the grain tank.

6. The method of claim 1, wherein the grain in the grain tank forms a shape of a cone having an apex, wherein the apex is positioned a first distance from a first wall of the grain tank and a second distance from a second wall of the grain tank, where the first distance is not equal to the second distance..

7. The method of claim 1, further calculating a sensed mass flow rate derived from the signal of the mass flow rate sensor over a given period of time and calculating a calibration mass flow rate derived from a change of mass of grain within the grain tank over the given period of time, and wherein calibrating the mass flow rate sensor is based at least in part on a difference between the sensed mass flow rate and the calibration mass flow rate.

8. The method of claim 1, wherein calibrating the mass flow rate from the mass flow rate sensor is derived only when the mass of the first portion of the grain is greater than a predetermined value and less than a second greater predetermined value.

9. A method of calibrating a mass flow sensor while harvesting grain into a grain tank comprising:
    sensing a volume of at least a first portion of the grain within the grain tank with a first sensor; and
    calibrating the mass flow sensor based at least in part on the volume of grain in the grain tank while the grain is being deposited within the grain tank.

10. The method of claim 9, wherein the first sensor is a non-contact sensor including at least one of a camera, an infrared device, and an ultrasonic device.

11. The method of claim 9, further including sensing the weight of the first portion of the grain within the grain tank with a second sensor; and
    determining the mass of all of the grain in the grain tank based on the sensed volume of the grain within the grain tank and the weight of the first portion of the grain in the grain tank; and
    wherein the step of calibrating the mass flow sensor is based at least in part on the volume of grain in the grain tank derived from the first sensor and the weight of the grain in the grain tank derived from the second sensor.

12. The method of claim 9, further including sensing the weight of the first portion of the grain located directly above a second sensor.

13. The method of claim 12, further including determining the mass of the grain in the grain tank at least in part by the geometric shape of the pile of the grain within the grain tank and the weight of a first portion of grain located directly above the second sensor.

14. The method of claim 9, further including determining the change of mass of the grain in the grain tank over a period of time.

15. The method of claim 9, further including determining the volume of the grain tank when the grain tank is empty.

16. An apparatus for calibrating a mass flow sensor while harvesting grain, comprising:
    a non-transient computer-readable medium containing computer readable code to direct one or more processing units to calculate the change of mass of grain within a grain tank during a period of time based at least in part on a signal from a first sensor configured to sense a first portion of the grain and a signal from a second sensor configured to sense a second portion of the grain; and to recalibrate a flow rate signal of a mass flow sensor based at least in part on the change of mass during the period of time.

17. The apparatus of claim 16, wherein the first sensor and the second sensor are positioned within the grain tank and provide a respective first and second signal directly related to a respective weight of a first and second column of grain located above each respective first and second sensor.

18. The apparatus of claim 16, wherein the first sensor is a non-contact sensor providing a signal related to the shape of the top surface of the grain located within the grain tank and the second sensor is a contact sensor providing a signal related to the weight of grain located directly above the second sensor.

19. The apparatus of claim 16, wherein the first sensor is a non-contact sensor including at least one of a camera, infrared device, and ultrasonic device.

20. The apparatus of claim 16, wherein the first portion of the grain is a non-uniform geometric shape of the grain within the grain tank.

21. The method of claim 1, wherein said calibrating of the mass flow rate sensor is based upon a determined change of accumulated mass of the first portion of grain in the grain tank over a period of time as a function of signals received from the first sensor, wherein the first portion is less than complete portion of the grain within the grain tank and wherein said calibrating of the mass flow rate sensor is not based upon the entire amount of grain within the grain tank.

22. A method of calibrating a mass flow sensor while harvesting grain comprising:
    sensing an accumulated mass of a first portion of grain within a grain tank with a first sensor positioned within the grain tank at a first position;
    sensing an accumulated mass of a second portion of grain within the grain tank with a second sensor positioned within the grain tank at a second different position; and
    calibrating a mass flow rate sensor based at least in part on a signal of the first sensor and the second sensor.

23. The method of claim 22, wherein the first sensor and the second sensor are part of a set of sensors and wherein calibrating the mass flow sensor is based upon signals received from the first subset of the set of sensors at a first time when a pile of grain within the grain tank has a first shape and a second subset, different than the first subset, of the set of sensors at a second time when the pile of grain has a second shape different than the first shape.

* * * * *